G. W. WHEELWRIGHT.
STOP MECHANISM FOR POWER PRESSES.
APPLICATION FILED MAY 21, 1909.
971,945.
Patented Oct. 4, 1910.
2 SHEETS—SHEET 2.
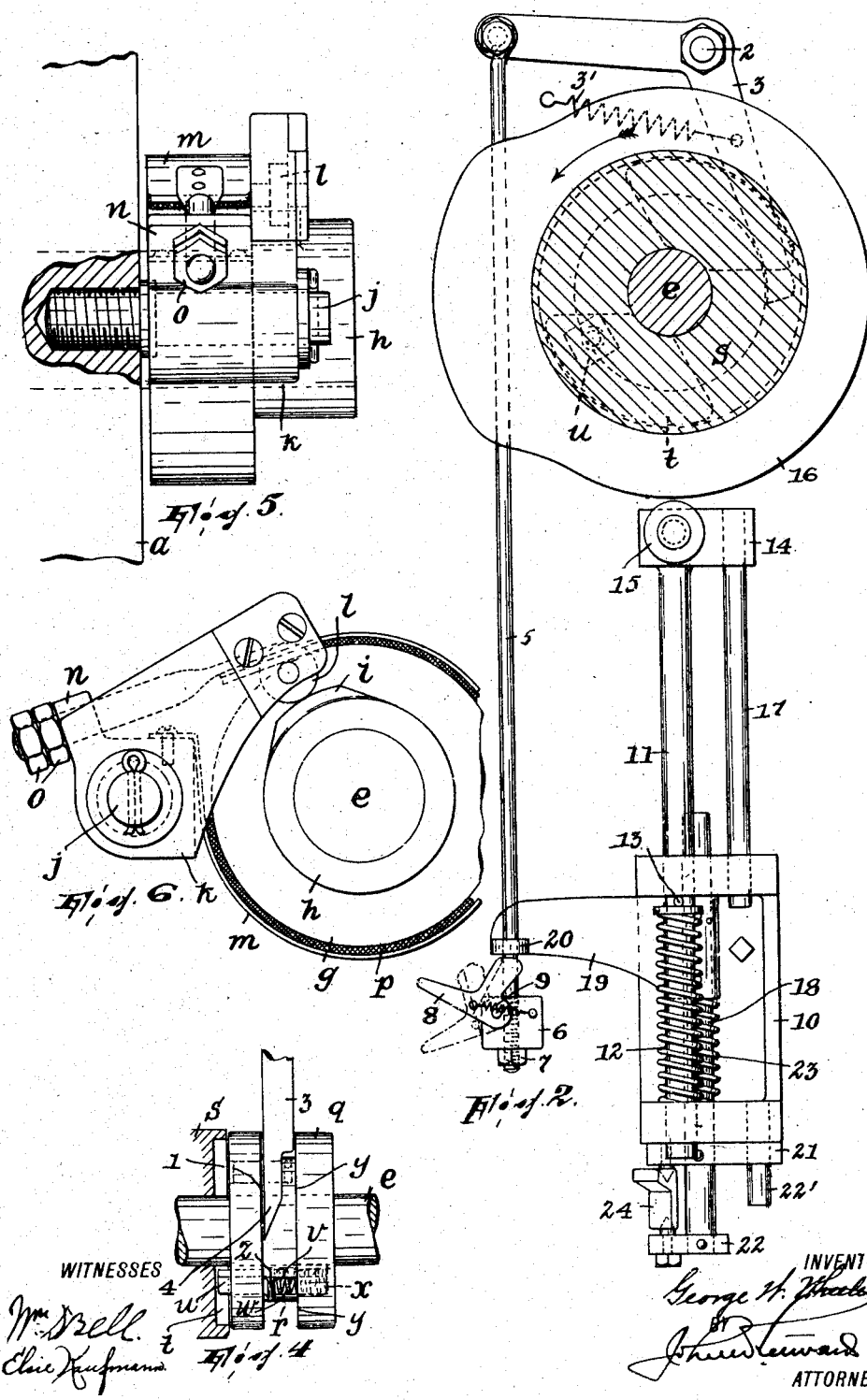

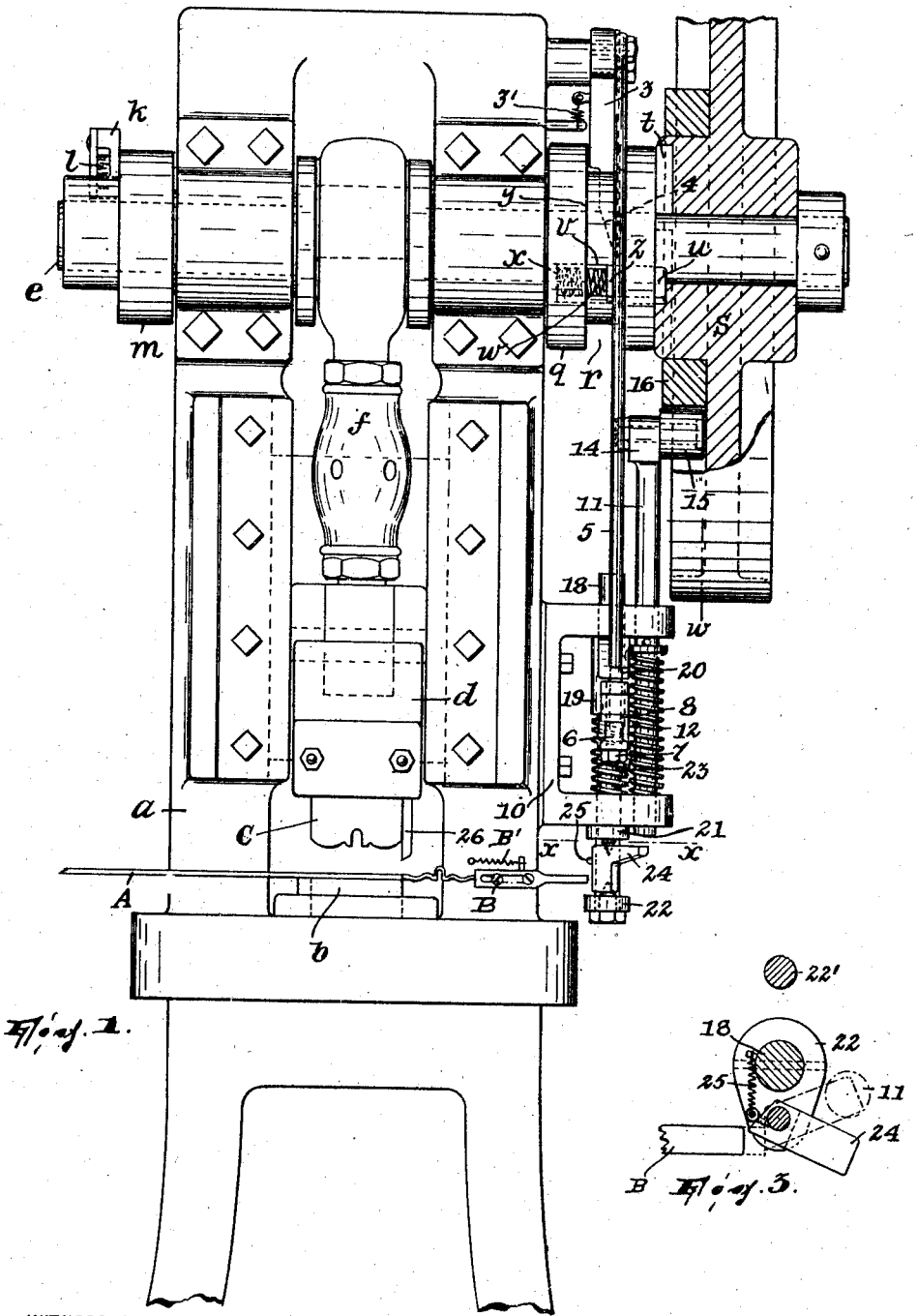

UNITED STATES PATENT OFFICE.

GEORGE W. WHEELWRIGHT, OF PATERSON, NEW JERSEY, ASSIGNOR OF ONE-HALF TO SLEETH MANUFACTURING COMPANY, OF BELLEVILLE, NEW JERSEY, A CORPORATION OF NEW JERSEY.

STOP MECHANISM FOR POWER-PRESSES.

971,945.      Specification of Letters Patent.      Patented Oct. 4, 1910.

Application filed May 21, 1909. Serial No. 497,483.

*To all whom it may concern:*

Be it known that I, GEORGE W. WHEELWRIGHT, a citizen of the United States, residing in Paterson, Passaic county, New Jersey, have invented a certain new and useful Improvement in Stop Mechanism for Power-Presses; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to power presses and its object is to provide a simple and reliable mechanism for controlling, from the material, the operation of the plunger carrying the movable die of the press.

In that adaptation of the invention which is particularly shown and described herein I employ, with a continuously rotating driving member, a driven member whose rotation produces the movements of the plunger, a clutch device carried by the driven member and normally tending to clutch said members together, and a part normally standing in the path of movement of the clutch device so as to withdraw the same from and retain it out of its interlocking position, (which combination of elements is old), a novel mechanism controlled from the material, for moving said part from engagement with the clutch device so that the latter will interlock the two members and cause the driven member to rotate, thus operating the plunger. The driving member, when said mechanism has been properly set from the material, produces the actuation of said mechanism necessary to move the part controlling the clutch device, and in the present adaptation thereupon immediately permits the clutch device to resume its normal position, so that, as soon as the bolt again comes around and engages said part, the driven member is again brought to a standstill, the plunger thus being allowed but one thrust for each impulse from the material; and, since if said mechanism should inadvertently remain in its "set" position (due to jamming of the work or any other cause) the plunger would continue operating, in order that the operator may stop the action of the plunger immediately, the mechanism in question is further so constructed that a break in the train of elements forming it may be quickly effected by the operator. I also employ a novel brake mechanism adapted to check the driven member immediately it is released from the driving member.

I shall now describe my invention in detail with respect to that adaptation thereof shown in the accompanying drawings, and then point out the various novel combinations in the clauses of the claims.

Referring to said drawings, Figure 1 is a front view of the press, showing certain parts in section; Fig. 2 is a view showing the driving member in section substantially in the vertical plane $w$ of Fig. 1 and showing the part controlling the clutch device aforesaid and the mechanism controlling said part in side elevation; Fig. 3 is a horizontal sectional view on the line $x-x$ in Fig. 1; Fig. 4 is a view showing the driven member in rear elevation and a portion of the driving member in section, and also showing the manner of interlocking said members and the part which controls the interlocking mechanism; Fig. 5 is a rear view of the parts involved in the brake mechanism; and, Fig. 6 is a view in side elevation of what is shown in Fig. 5.

$a$ designates the frame of the press, $b$ the lower die, $c$ the upper die, $d$ the plunger, $e$ the crank-shaft and $f$ the pitman connecting the plunger and crank shaft in the usual manner.

At one end of the crank-shaft $e$ is secured thereon a brake-wheel $g$ whose laterally projecting hub $h$ is formed with a peripheral lobe $i$, forming a cam. On a fixed stud $j$ projecting from the frame parallel with the shaft $e$ is fulcrumed a lever $k$ carrying a roller $l$ which bears on the cam $h$.

$m$ is a metallic strap which is permanently fixed on one end to the lever $k$ and which embraces the brake wheel $g$, the other end of such strap being threaded, extended through a projection $n$ on the lever and carrying the nuts $o$. To the inner side of the strap $m$ is suitably secured a leather friction-piece *p*. This brake mechanism is calculated to bring the rotating crank-shaft *e* and the plunger *d* operated therefrom to a standstill on each complete revolution of the crank-shaft, as will appear later; adjustment of said brake mechanism may be effected, of course, by manipulating the nuts *o*. On the other end of shaft *e* is fixed a driven clutch-member *q* having a peripheral groove *r* formed therein. The brake-wheel *g* and member *q* of course limit the shaft against endwise movement in its bearings. On shaft *e* is also journaled, face to face with member *q*, the driving clutch-member *s*, which may be a pulley. The clutch-member *s* is formed with suitable recesses *t* in the portion thereof directly opposed to clutch-member *q*, while clutch-member *r* carries a clutch device in the form of a bolt *u* which slides therein parallel with the axis of shaft *e*, being adapted to enter one of the recesses *t* and thereby interlock the clutch-members *q* and *s*. The bolt *u* works in a transverse groove *v* formed in the groove *r*, and it is normally pressed toward clutch-member *s* by a spiral spring *w* arranged in the groove *v* and projecting into a suitable seat *x* countersunk in one side *y* of the groove *r*. The movement of the bolt toward the clutch-member *s* is limited by a lateral projection *z* on the bolt which engages the other side 1 of said groove *r*.

On a fixed stud 2 parallel with shaft *e* is fulcrumed a lever 3 one arm of which at its end 4 is beveled toward the side 1 of the groove *r* of clutch-member *q*, with which side said arm lies in close relation when the arm is in its normal position, that is, with its beveled end projecting into the groove. The lever is held in the position shown in Fig. 2 by a spring 3'. Thus, when parts *q* and *s* are rotating together, the bolt *u* transmitting the rotation of the latter to the former, and the beveled end of lever 3 projects into the groove *r*, the projection *z* will ride along the bevel 4 and be withdrawn from its interlocking position; when the lever 3 is shifted on its fulcrum, it releases the bolt so that clutch-members *s* and *u* become again interlocked and the plunger is consequently reciprocated. I come now to the means for controlling the position of lever 3:

Depending from the free arm of lever 3 is a rod 5 which is tapped at its lower end into a block 6 secured by a lock-nut 7. Pivoted on this block is a dog 8 which is limited for movement in either of two positions, as shown in Fig. 2, and has a spring 9 connecting it with the block and adapted to hold it in either of such positions.

A two-armed bracket 10 is attached to the frame *a* and in this slides vertically a rod 11 which is normally held elevated by a spiral spring 12 coiled around it between the lower arm of the bracket and a pin 13 on the rod. The upper end of this rod has a head 14 carrying a roller 15 adapted to be engaged by the periphery of a cam 16 fixed to member *s* and also carrying a depending rod 17 which slides in the upper arm of the bracket and holds rod 11 from turning. Parts 11, 14, 15 and 17 constitute in substance a slide, movable vertically. In bracket 10 is also arranged to move vertically another slide comprising a rod 18, a forwardly projecting arm 19 fixed to said rod and having a projection 20 penetrated by rod 5 above dog 8 and vertically spaced cross-heads 21 and 22 disposed beneath the bracket 10, against the lower end of which the cross-head 21 is normally held by a spiral spring 23 interposed between arm 19 and the lower arm of the bracket and coiled around rod 18; the slide is kept from turning by a stud 22' on bracket 10 penetrating cross-head 22. In the cross-heads is pivoted a block 24 held normally in the position shown in full lines in Fig. 3 by a spring 25. In this position, as the material A is intermittently advanced and actuates the "shuttle" B, the latter engages the block and turns it into the dotted-line position (Fig. 3) in the path of downward movement of rod 11.

26 is a knife adapted to sever the articles as fast as formed.

Operation: The driving member *s* being rotated by a belt or other means continuously, the dog 8 being in the position shown in Fig. 2, and the material being fed forward continuously, each time the plunger descends an article will be formed from the strip of material and on the next succeeding descent the article thus formed will be severed by the knife 26. In the advance of the material it engages the shuttle B and causes the latter to turn the block 24 in its bearings into the dotted line position in Fig. 3. When the high part of the cam 16 now bears upon roller 15 and depresses the slide comprising parts 11, 14, 15 and 17, said slide will, through the block 24, cause the other slide to be depressed, the arm 19 bearing down upon dog 8 and through the latter depressing the rod 5 and hence turning lever 3 on its fulcrum against the tension of its spring, so that the beveled end of said lever is moved out of engagement with the bolt *u*. The bolt is now pressed forward by its spring into one of the recesses *t* in clutch member *s*, so that member *s* and the member comprising parts *q*, *e*, *g*, and *h* are interlocked and the latter rotates with the former. Subsequently, the high part of the cam 16 leaves the slide first mentioned above, so that the spring 12 again raises said slide, and this in turn leaves the other slide free to rise under the tension of its spring 23 and, consequently, lever 3 to resume its normal position, i. e., with its beveled end projecting into groove r; therefore, before the driven member can complete more than one full revolution, the bolt u is again engaged by the beveled end of lever 3 and withdrawn from engagement with driving member s, so that the driven member is released from member s. (Meanwhile, of course, the rotation of the driven member has depressed and elevated the plunger, with the effect of severing the article previously formed and forming another article). While the lever 3 is disestablishing the clutch connection between clutch-members q and s, the lobe i on cam h engages roll l of lever k and turns the latter on its fulcrum so that tension is applied to the strap m and a braking action applied to brake-wheel g sufficient to bring the driven member and hence the plunger to a standstill. The severing of the material of course relaxes the pressure thereof on the "shuttle" B which, being withdrawn by its own spring B' and the spring 25 of block 24, allows the latter to be retracted so as to be out of the path of the first-mentioned slide (when it is next depressed by cam 16) unless it has been again pressed by the advancing material into the path of said slide. This operation is repeated each time the advance of the material acts to "set" the mechanism which controls the clutch-device, and which is actuated by the driving member, by moving the block 24 into the path of downward movement of the first-mentioned slide. While the driven member is rotated, it is substantially free of the braking influence of the brake mechanism, which is only effectual to stop its rotation when the driven member has been released from the driving member.

Occasionally the feed of the material may become jammed while holding the block 24 in the position in which the mechanism comprising it has been above described as "set." In order to prevent any damage or other undue results when such a condition is met with, the dog 8 is provided; under the circumstances mentioned the operator may at once stop the action of the plunger by manually depressing the dog into the dotted-line position in Fig. 2, so that the arm 19 descends idly and, since lever 3 is not actuated, the bolt u will be held retracted thereby.

Having thus fully described my invention, what I claim as new and desire to secure by Letters Patent is:

1. The combination of the frame, a driving member having a cam, a driven member, means, actuated by the driven member, for operating on the work, a clutch device normally operative to connect the driving and driven members, a movable member controlling the clutch device, a slide operated by said cam and guided in the frame, another slide guided in the frame, operative connecting means between said movable member and the second slide, and a part, movable in one of said slides into and out of interposed relation between the slides, for transmitting movement from the first to the second slide, substantially as described.

2. The combination of the frame, a driving member having a cam, a driven member, means, actuated by the driven member, for operating on the work, a clutch device normally operative to connect the driving and driven members, a movable member controlling the clutch device, a slide operated by said cam and guided in the frame, another slide guided in the frame, operative connecting means between said movable member and the second slide, and a work-controlled part, pivotally movable in one of said slides into and out of interposed relation between the slides, for transmitting movement from the first to the second slide, substantially as described.

3. The combination of the frame, a driving member having a cam, a driven member, means, actuated by the driven member, for operating on the work, a clutch device normally operative to connect the driving and driven members, a movable member controlling the clutch device, a slide operated by said cam and guided in the frame, another slide guided in the frame, operative connecting means between said movable member and the second slide, said means comprising a part movable to render the same operative or inoperative, and a part, movable in one of said slides into and out of interposed relation between the slides, for transmitting movement from the first to the second slide, substantially as described.

In testimony that I claim the foregoing I have hereunto set my hand this 17th day of May, 1909.

GEO. W. WHEELWRIGHT.

Witnesses:
JOHN W. STEWARD,
WM. D. BELL.